(12) United States Patent
Kato

(10) Patent No.: US 10,579,541 B2
(45) Date of Patent: Mar. 3, 2020

(54) CONTROL DEVICE, STORAGE SYSTEM AND METHOD

(71) Applicant: FUJITSU LIMITED, Kawasaki-shi, Kanagawa (JP)

(72) Inventor: Jun Kato, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 64 days.

(21) Appl. No.: 15/791,460

(22) Filed: Oct. 24, 2017

(65) Prior Publication Data

US 2018/0150408 A1    May 31, 2018

(30) Foreign Application Priority Data

Nov. 28, 2016 (JP) .................................. 2016-229640

(51) Int. Cl.
  *G06F 12/12* (2016.01)
  *G06F 12/128* (2016.01)
  *G06F 12/0846* (2016.01)
  *G06F 12/122* (2016.01)

(52) U.S. Cl.
  CPC ........ *G06F 12/128* (2013.01); *G06F 12/0848* (2013.01); *G06F 12/122* (2013.01); *G06F 2212/621* (2013.01)

(58) Field of Classification Search
  CPC .. G06F 12/128; G06F 12/122; G06F 12/0848; G06F 2212/621; G06F 12/123; G06F 12/127
  See application file for complete search history.

(56) References Cited

U.S. PATENT DOCUMENTS

| 7,818,493 B2 * | 10/2010 | Traister ............... G06F 12/0246 711/103 |
| 9,141,527 B2 * | 9/2015 | Atkisson ............. G06F 12/0802 |
| 9,442,863 B1 * | 9/2016 | Kelkar .................. G06F 12/128 |
| 2004/0098541 A1 * | 5/2004 | Megiddo ............... G06F 12/122 711/129 |

(Continued)

FOREIGN PATENT DOCUMENTS

| JP | 07-129470 | 5/1995 |
| JP | 2013-196755 | 9/2013 |

OTHER PUBLICATIONS

H-ARC: A Non-Volatile Memory Based Cache Policy for Solid State Drives (2014); (Year: 2014).*

(Continued)

*Primary Examiner* — Tracy C. Chan
(74) *Attorney, Agent, or Firm* — Fujitsu Patent Center

(57) ABSTRACT

A control device includes a cache memory configured to store a first, a second, a third and a fourth list, each of the first, the second, the third and the fourth list storing information indicating data stored in the cache memory, and each of the first, the second, the third and the fourth list being managed under a LRU algorithm, and when first data stored in the storage device is accessed, register first information indicating the first data into the first list, and when the first data is stored in the storage device, register second information indicating the first data into the second list, a processor coupled to the memory and configured to receive a first request for reading the first data, and based on the first request, move the first information from the first list to the third list, while remain the second information in the second list.

20 Claims, 18 Drawing Sheets

(56) References Cited

U.S. PATENT DOCUMENTS

| | | | |
|---|---|---|---|
| 2011/0072214 A1* | 3/2011 | Li | G06F 12/0848 |
| | | | 711/124 |
| 2013/0242425 A1 | 9/2013 | Zayas et al. | |
| 2015/0074345 A1* | 3/2015 | Zhu | G06F 12/0871 |
| | | | 711/103 |
| 2015/0149730 A1* | 5/2015 | Hu | G06F 3/0613 |
| | | | 711/136 |
| 2015/0347316 A1* | 12/2015 | Carofiglio | G06F 12/123 |
| | | | 711/136 |
| 2016/0085457 A1 | 3/2016 | Zayas et al. | |
| 2016/0147443 A1* | 5/2016 | van Riel | G06F 3/061 |
| | | | 711/103 |
| 2016/0196063 A1* | 7/2016 | Chung | G11C 16/06 |
| | | | 711/103 |
| 2017/0220592 A1* | 8/2017 | Foltz | G06F 3/0613 |
| 2017/0336983 A1* | 11/2017 | Roh | G06F 12/0811 |

OTHER PUBLICATIONS

Ziqi Fan et al., "H-ARC: A Non-Volatile Memory Based Cache Policy for Solid State Drives", Mass Storage Systems and Technologies (MSST), 2014 30th Symposium on Jun. 2-6, 2014, IEEE (12 pages).

\* cited by examiner

FIG. 11

| PAGE CLASSIFICATION TABLE | | | 601 |
|---|---|---|
| R-SERIES | D-SERIES | PAGE TYPE |
| R1 OR R2 | D1 OR D2 | Cross |
| GR1 OR GR2 | D1 OR D2 | Buffer |
| NONE | D1 OR D2 | Buffer |
| R1 OR R2 | GD1 OR GD2 | Clean |
| GR1 OR GR2 | GD1 OR GD2 | - |
| NONE | GD1 OR GD2 | - |
| R1 OR R2 | NONE | Clean |
| GR1 OR GR2 | NONE | - |
| NONE | NONE | - |

FIG. 12

| | TRANSITION TABLE IN I/O PROCESSING | 602 |
|---|---|---|
| I/O TYPE | PAGE TYPE BEFORE TRANSITION | PAGE TYPE AFTER TRANSITION |
| Read | Cross | Cross |
| Read | Clean | Clean |
| Read | Buffer | Cross |
| Read | – | Clean |
| Write | Cross | Cross |
| Write | Clean | Cross |
| Write | Buffer | Cross |
| Write | – | Cross |

FIG. 13

| TRANSITION TABLE IN PAGE RELEASE DETERMINATION | | | 603 |
|---|---|---|
| SERIES | PAGE TYPE BEFORE TRANSITION | PAGE TYPE AFTER TRANSITION |
| R-SERIES | Cross | Buffer |
| R-SERIES | Clean | – (PAGE RELEASE) |
| D-SERIES | Cross | Clean |
| D-SERIES | Buffer | – (PAGE RELEASE) |

FIG. 15

| IDEAL LENGTH INCREASE AND DECREASE TABLE | | | |
|---|---|---|---|
| GHOST LIST | HIT REGION | DECREASE IN IDEAL LENGTH | INCREASE IN IDEAL LENGTH |
| GR1 | Near | R2 | R1 |
| GR1 | Far | D1 OR D2 | R1 |
| GR2 | Near | R1 | R2 |
| GR2 | Far | D1 OR D2 | R2 |
| GD1 | Near | D2 | D1 |
| GD1 | Far | R1 OR R2 | D1 |
| GD2 | Near | D1 | D2 |
| GD2 | Far | R1 OR R2 | D2 |

242

CONTROL DEVICE, STORAGE SYSTEM AND METHOD

CROSS-REFERENCE TO RELATED APPLICATION

This application is based upon and claims the benefit of priority of the prior Japanese Patent Application No. 2016-229640, filed on Nov. 28, 2016, the entire contents of which are incorporated herein by reference.

FIELD

The embodiments discussed herein are related to a control device, a storage system and a method.

BACKGROUND

Adaptive replacement cache (ARC) is a data replacement algorithm for managing a cache region. In ARC, a cache region is divided into a region managed based on Recency and a region managed based on Frequency. In addition, the size of each region is optimized based on a history of data evicted from each region.

Hierarchical-ARC (H-ARC) is a technology based on ARC. In H-ARC, a cache region is further divided into a region for dirty data and a region for clean data.

The following technologies related to caches are also proposed. For example, a hybrid disk drive is proposed in which data blocks stored in a flash memory included by the disk drive are managed by ARC. In addition, a disk control device is proposed in which dirty data to be written back is compressed on a cache region to prepare for a write to a disk drive. Examples of the related art include Japanese Laid-open Patent Publication No. 2013-196755, Japanese Laid-open Patent Publication No. 07-129470, and "H-ARC: A Non-Volatile Memory Based Cache Policy for Solid State Drives."

SUMMARY

According to an aspect of the embodiments, a control device configured to be coupled to a storage device, the control device includes a cache memory configured to store a first list, a second list, a third list and a fourth list, each of the first list, the second list, the third list and the fourth list storing information indicating data stored in the cache memory, and each of the first list, the second list, the third list and the fourth list being managed under a least recently used (LRU) algorithm, and when first data stored in the storage device is accessed, store the first data, and register first information indicating the first data into the first list, and when the first data is stored in the storage device, store the first data, and register second information indicating the first data into the second list, a processor coupled to the memory and configured to receive a first request for reading the first data, and based on the first request, move the first information from the first list to the third list, while remain the second information in the second list without moving the second information to the fourth list.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 11 is a diagram illustrating an example of a page classification table;

FIG. 12 is a diagram illustrating an example of a transition table in input/output (I/O) processing;

FIG. 13 is a diagram illustrating an example of a transition table in page release determination;

FIG. 15 is a diagram illustrating an example of an ideal length increase and decrease table;

DESCRIPTION OF EMBODIMENTS

In H-ARC, data stored in a cache region is managed by four least recently used (LRU) lists. A first list and a second list manage clean data. A third list and a fourth list manage dirty data. In addition, when reading of data belonging to the first list is requested, the data is moved to the second list. Thus, as compared with the first list, the second list manages data with high read frequency. In addition, when updating of data belonging to the third list is requested, the data is moved to the fourth list. Thus, as compared with the third list, the fourth list manages data with high update frequency.

However, in H-ARC, when reading of data belonging to the third list is requested, the data is moved to the fourth list though the data may not be said to have high update frequency. Therefore, it is difficult to manage data with high update frequency correctly. Efficiency of management of the cache region is consequently degraded.

The present embodiments will hereinafter be described with reference to the drawings.

First Embodiment

Figure 1:
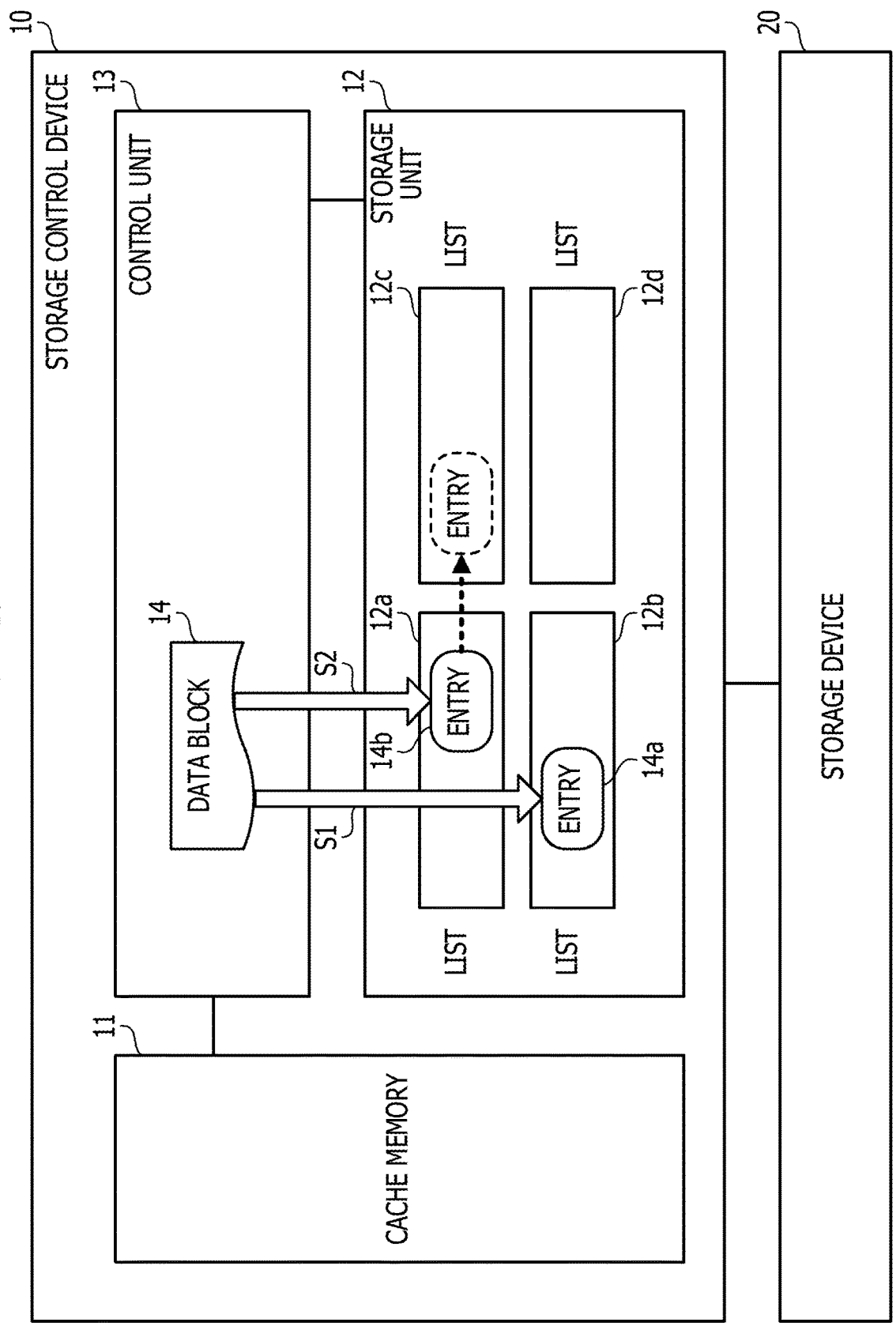
FIG. 1 is a diagram illustrating a storage system according to a first embodiment.

FIG. 1 is a diagram illustrating a storage system according to a first embodiment. The storage system illustrated in FIG. 1 includes a storage control device 10 and a storage device 20. The storage control device 10 controls access to the storage device 20 by using a cache memory 11. For example, the storage control device 10 receives a request for access to the storage device 20 from a host device (not illustrated), and temporarily stores data requested to be accessed in the cache memory 11. When the storage control device 10 thereafter receives an access request from the host device, and the data requested to be accessed is present in the cache memory 11, the storage control device 10 accesses the cache memory 11. Access speed is thereby improved. The storage device 20, for example, includes one or a plurality of hard disk drives (HDDs) or solid state drives (SSDs).

The storage control device 10 includes a storage unit 12 and a control unit 13 in addition to the cache memory 11 described above. The storage unit 12 is, for example, implemented as a storage area of a volatile storage device such as a random access memory (RAM). In addition, the storage unit 12 and the cache memory 11 may be implemented by a same storage device. The control unit 13 is, for example, a processor. The processor may include a central processing unit (CPU), a digital signal processor (DSP), an application specific integrated circuit (ASIC), and a field programmable gate array (FPGA). In addition, the control unit 13 may be a multiprocessor.

The storage unit 12 stores lists 12a and 12b. The list 12a manages, by an LRU system, data blocks requested to be read among data blocks stored in the cache memory 11. The list 12b manages, by the LRU system, data blocks requested to be written among the data blocks stored in the cache memory 11.

Incidentally, in FIG. 1, as an example, the storage unit 12 further stores lists 12c and 12d. When a data block belonging to the list 12a is requested to be read, the belonging destination of the data block is moved from the list 12a to the list 12c. Thus, as compared with the list 12a, data blocks with high reading frequency belong to the list 12c. When updating of a data block belonging to the list 12b is requested, the belonging destination of the data block is moved from the list 12b to the list 12d. Thus, as compared with the list 12b, data blocks with high update frequency belong to the list 12d. In addition, in the case where the lists 12c and 12d are stored, when a certain data block stored in the cache memory 11 no longer belongs to any of the lists 12a to 12d, this data block is evicted from the cache memory 11.

When the control unit 13, for example, receives a request to read a data block 14 stored in the cache memory 11, the control unit 13 performs processing as follows. The control unit 13 refers to the list 12b, and determines whether the data block 14 belongs to the list 12b (step S1). In FIG. 1, list elements are included as "entries," and as an example, a case is illustrated in which an entry 14a corresponding to the data block 14 is included in the list 12b.

When the data block 14 belongs to the list 12b as in the example of FIG. 1, the control unit 13 maintains the state of the list 12b as it is, and updates the belonging state of the data block 14 in the list 12a (step S2). For example, when an entry 14b corresponding to the data block 14 is already included in the list 12a, the control unit 13 moves the entry 14b from the list 12a to the list 12c, as indicated by a dotted line arrow. Incidentally, in a case where the list 12c is not present, the entry 14b may be moved to the head of the list 12a. In addition, when the entry 14b corresponding to the data block 14 is not included in any of the lists 12a and 12c, the control unit 13 adds the new entry 14b to the list 12a.

Here, the lists 12b and 12d manage the update frequency of data blocks stored in the cache memory 11. For example, the list 12b manages data blocks with relatively low update frequency, and the list 12d manages data blocks with relatively high update frequency. In addition, even in the case where the list 12d is not present, the list 12b manages the update frequency of data blocks stored in the cache memory 11. For example, the higher the update frequency of a data block, the longer the data block belongs to the list 12b.

As described above, when reading of the data block 14 belonging to the list 12b is requested, the storage control device 10 according to the present embodiment maintains the state of the list 12b as it is. Thus, the reading request does not affect the management of update frequency by the list 12b or the lists 12b and 12d. Hence, the storage control device 10 may correctly manage the update frequency of data blocks stored in the cache memory 11.

Besides, when the reading of the data block 14 belonging to the list 12b is requested, the belonging state of the data block 14 in the list 12a, rather than in the list 12b, is updated. Hence, the storage control device 10 may manage the reading frequency of data blocks stored in the cache memory 11 by using the list 12a or the lists 12a and 12c.

Second Embodiment

Figure 2:
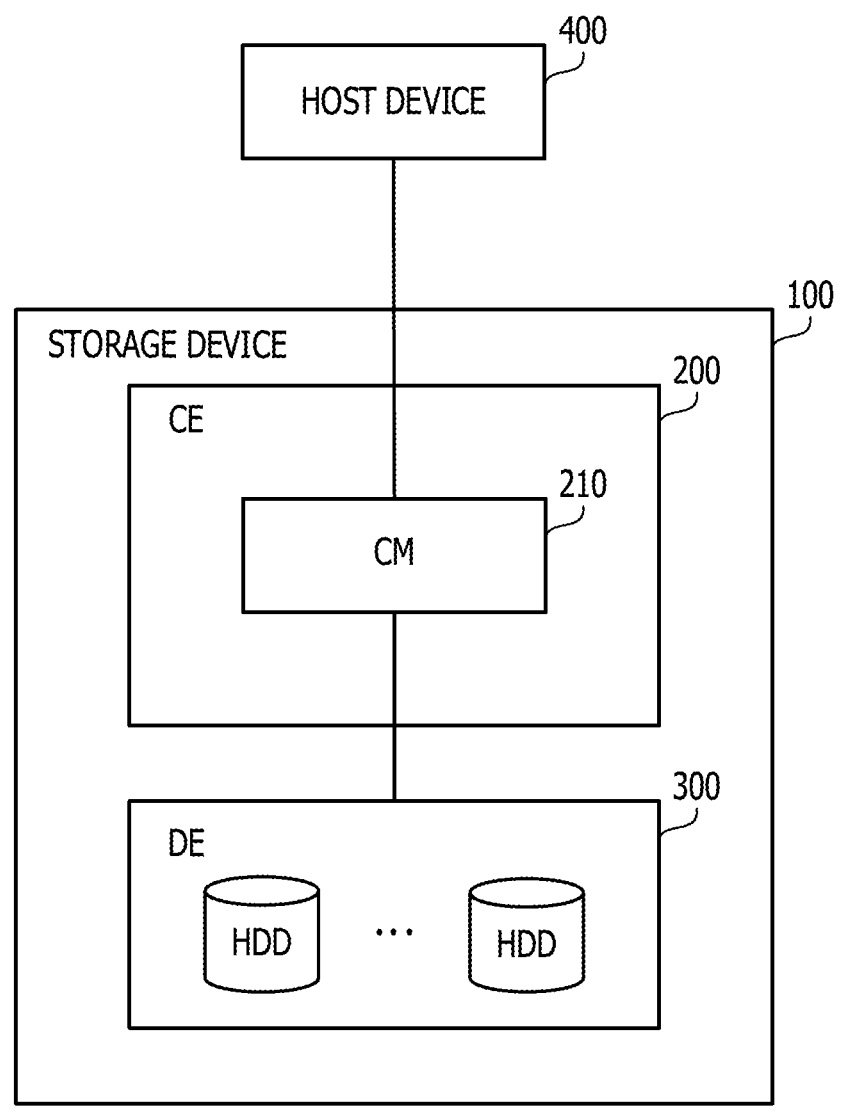
FIG. 2 is a diagram illustrating a storage system according to a second embodiment.

FIG. 2 is a diagram illustrating a storage system according to a second embodiment. The storage system illustrated in FIG. 2 includes a storage device 100 and a host device 400. The storage device 100 and the host device 400 are, for example, coupled to each other via a storage area network (SAN) using a fibre (or fiber) channel (FC), internet small computer system interface (iSCSI), or the like.

The storage device 100 includes a controller enclosure (CE) 200 and a device enclosure (DE) 300. The CE 200 includes a controller module (CM) 210. The CM 210 controls the whole of the storage device 100.

The DE 300 includes a plurality of storage devices. The DE 300 is a disk array device including HDDs as the storage devices. Incidentally, the storage devices included in the DE 300 may be storage devices of another kind, such as SSDs.

The CM 210 also controls access to the storage devices included in the DE 300 in response to a request from the host device 400. For example, the CM 210 creates logical volumes implemented by physical storage areas of the storage devices within the DE 300. Logical unit numbers (LUNs) are assigned to the logical volumes. In addition, the logical volumes are divided into logical blocks of a fixed size, and a logical block address (LBA) is given to each logical block. Then, the CM 210 controls access to the logical volumes in response to an access request from the host device 400.

Figure 3:
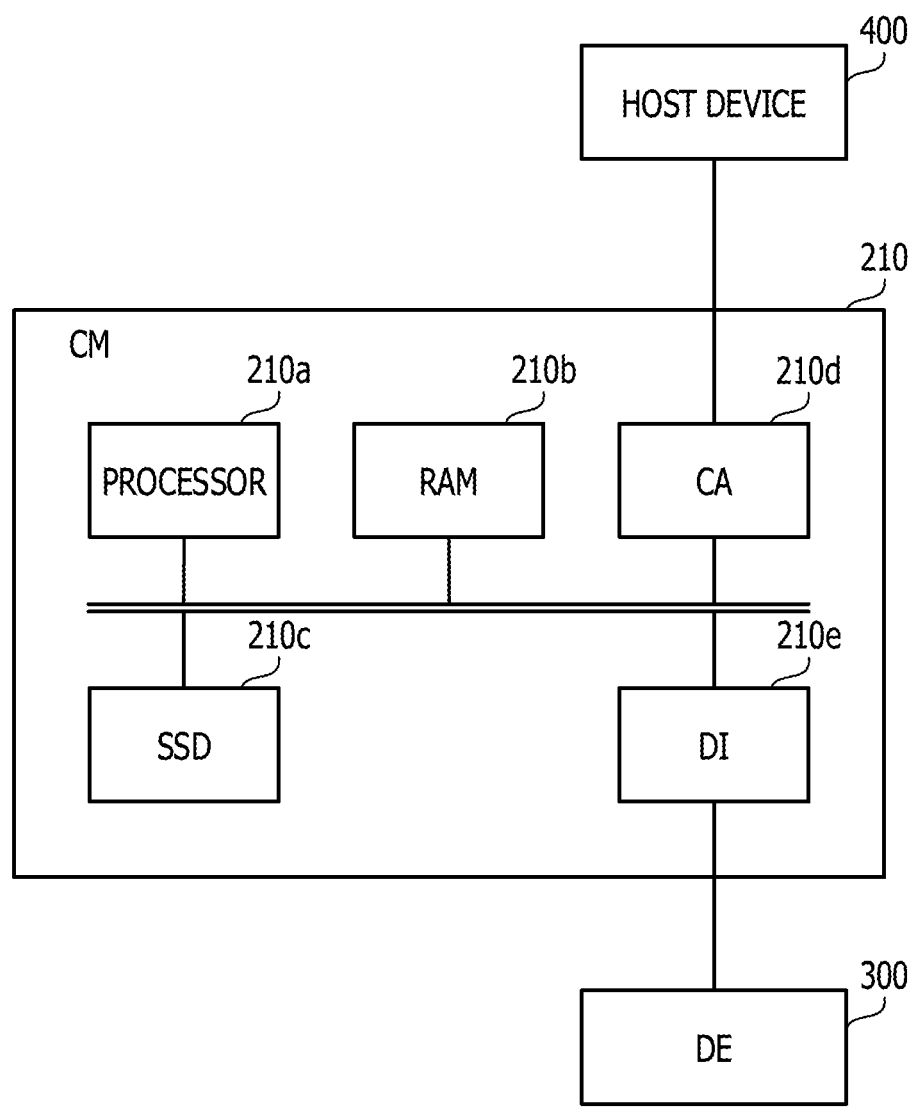
FIG. 3 is a diagram illustrating an example of hardware of a controller module (CM)

FIG. 3 is a diagram illustrating an example of hardware of a CM. The CM 210 includes a processor 210a, a RAM 210b, an SSD 210c, a channel adapter (CA) 210d, and a device interface (DI) 210e.

The processor 210a controls information processing of the CM 210. The processor 210a may be a multiprocessor including a plurality of processing elements.

The RAM 210b is a main storage device of the CM 210. The RAM 210b temporarily stores at least part of an operating system (OS) program and an application program that the processor 210a is made to execute. The RAM 210b also stores various kinds of data used for processing by the processor 210a.

The SSD 210c is an auxiliary storage device of the CM 210. The SSD 210c is a nonvolatile semiconductor memory. The SSD 210c stores the OS program, application programs, and various kinds of data. Incidentally, the CM 210 may include an HDD as an auxiliary storage device in place of the SSD 210c.

The CA 210d is an interface for communicating with the host device 400. The DI 210e is an interface for communicating with the DE 300.

Figure 4:
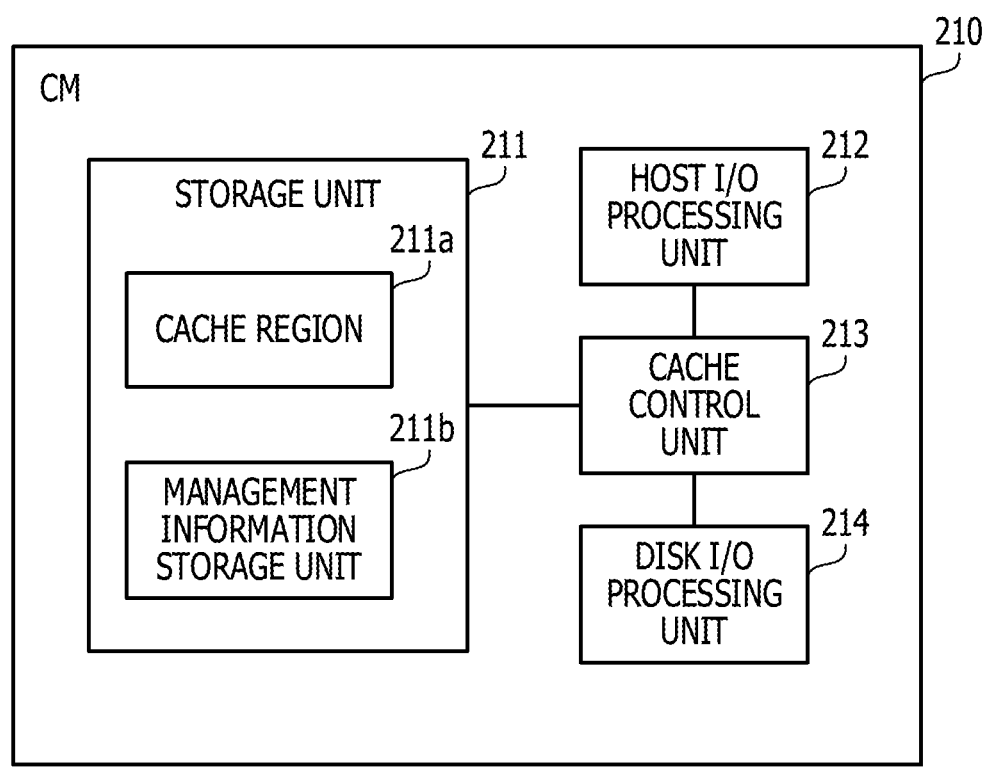
FIG. 4 is a diagram illustrating an example of configuration of functions possessed by a CM.

FIG. 4 is a diagram illustrating an example of configuration of functions possessed by a CM. The CM 210 includes a storage unit 211, a host I/O processing unit 212, a cache control unit 213, and a disk I/O processing unit 214.

The storage unit 211 is implemented as a storage area secured in the RAM 210b. The storage unit 211 includes a cache region 211a and a management information storage unit 211b. The cache region 211a temporarily stores data of part of the logical blocks included in the logical volumes. The cache region 211a is managed in page units, and data of one logical block is stored in one page. Incidentally, in the following description, the data of a logical block may be described as a "data block." The management information storage unit 211b stores various kinds of management information used in control of storage into the cache region 211a.

The host I/O processing unit 212, the cache control unit 213, and the disk I/O processing unit 214 are, for example, implemented as modules of a program executed by the processor 210a.

The host I/O processing unit 212 receives an access request (a write request or a read request) from the host device 400, and requests the cache control unit 213 to perform processing according to the access request. For example, when receiving a write request, the host I/O processing unit 212 transfers a writing destination address and write data received together with the write request to the cache control unit 213, and requests write processing. When receiving a read request, on the other hand, the host I/O processing unit 212 transfers a reading source address to the cache control unit 213, and requests read processing. Then, the host I/O processing unit 212 receives read data from the cache control unit 213, and transmits the read data to the host device 400.

The cache control unit 213 performs access processing requested from the host I/O processing unit 212 using the cache region 211a. For example, the cache control unit 213 temporarily stores, in the cache region 211a, data blocks read from the DE 300 in response to read requests and data blocks requested to be written. Then, when a data block requested to be accessed is present in the cache region 211a, the cache control unit 213 basically performs write processing or read processing by accessing the cache region 211a without accessing the DE 300. In addition, the cache control unit 213 manages reading and writing processing on the cache region 211a such that recently accessed data blocks and data blocks with high access frequency are retained in the cache region 211a.

The disk I/O processing unit 214 accesses the DE 300 in response to a request from the cache control unit 213. For example, when a data block requested to be read is not present in the cache region 211a, the disk I/O processing unit 214 reads the data block from the DE 300 in response to the request from the cache control unit 213. In addition, the disk I/O processing unit 214 writes dirty data present in the cache region 211a to the DE 300 in response to a request from the cache control unit 213.

A method of managing the cache region 211a will next be described. In the following description, a comparative example for comparison with a cache managing method according to the second embodiment will first be described with reference to FIG. 5, and thereafter the cache managing method according to the second embodiment will be described with reference to FIG. 6 and subsequent figures.

Figure 5:
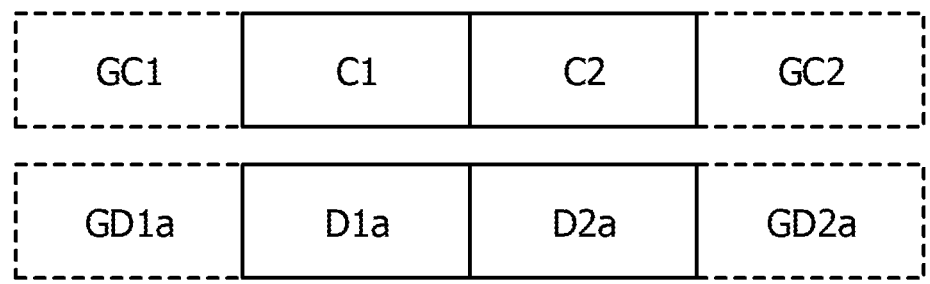
FIG. 5 is a diagram illustrating a comparative example of a cache managing method.

FIG. 5 is a diagram illustrating a comparative example of a cache managing method. FIG. 5 illustrates a cache managing method using H-ARC.

In H-ARC, data blocks stored in the cache region are managed by four lists C1, C2, D1a, and D2a. The lists C1, C2, D1a, and D2a are each managed on an LRU basis. In addition, a data block stored in the cache region belongs to one of the lists C1, C2, D1a, and D2a.

When a data block not present in the cache region is requested to be read, for example, the data block is added to the list C1. When the data block belonging to the list C1 is further requested to be read, the belonging destination of the data block is moved to the list C2. Hence, data blocks requested to be read once from a state of being not present in the cache region belong to the list C1. In addition, data blocks requested to be read twice or more from a state of being not present in the cache region, for example, data blocks for which a cache hit has occurred once or more in regard to read belong to the list C2.

In addition, when a data block not present in the cache region is requested to be written, the data block requested to be written is added to the list D1a. When the data block stored in the list D1a is further requested to be updated, the belonging destination of the data block after update is moved to the list D2a. Hence, the data of logical blocks requested to be written once from a state of being not present in the cache region belongs to the list D1a. In addition, data blocks requested to be written twice or more from a state of being not present in the cache region, for example, data blocks updated once or more belong to the list D2a.

As a result of the above processing, the lists C1 and D1a are managed based on Recency, and the lists C2 and D2a are managed based on Popularity (or Frequency).

Here, data blocks belonging to the lists D1a and D2a are written back to the DE 300 in given timing of being evicted from the lists D1a and D2a or the like. In writeback from the list D1a, a data block not updated after being stored in the cache region is written back. In writeback from the list D2a, on the other hand, a data block updated once or more after being stored in the cache region is written back. Therefore, the relative number of times of writing (writeback) of a data block belonging to the list D2a to the DE 300 with respect to the number of times of writing from the host device for the same logical block is smaller than that of a data block belonging to the list D1a.

For example, because the data of logical blocks with high update frequency is retained in the list D2a, control is performed so as not to write back such data to the DE 300 for as long a time as possible. Thus, the number of times of actual writing to the DE 300 may be reduced from a total number of times of writing from the host device. When a storage device in which the number of times of writing is limited as in an SSD is used as a back-end storage device, for example, the number of times of writing to that storage device is reduced. The life of the storage device may consequently be extended.

Incidentally, H-ARC further uses lists GC1, GC2, GD1a, and GD2a corresponding to a ghost cache. The lists GC1, GC2, GD1a, and GD2a are each managed on an LRU basis. Data blocks evicted from the lists C1, C2, D1a, and D2a are added to the lists GC1, GC2, GD1a, and GD2a, respectively. The data blocks belonging to the lists GC1, GC2, GD1a, and GD2a are not actually stored in the cache region. In actuality, only metadata of those data blocks are linked to the lists GC1, GC2, GD1a, and GD2a. These lists GC1, GC2, GD1a, and GD2a are used to optimize the size of the lists C1, C2, D1a, and D2a.

H-ARC has the following problems. As described above, the list D2a is managed based on Popularity (or Frequency). For example, a purpose of the list D2a is to manage data blocks that tend to be overwritten. However, in H-ARC, when a data block belonging to the list D1a is requested to be read, the belonging destination of the data block is moved to the list D2a. When this data block further continues to be requested to be read, the data block continues to belong to the list D2a.

Such control is performed for the following reasons, for example. The above-described data block is requested to be read after being requested to be written, and is thus considered to have high access frequency. It is therefore considered that the data block is not to be allowed to fall off the cache region easily by being moved to the list managed based on Popularity. However, this data block is dirty data requested to be written, and is thus moved to the list D2a.

However, in the case as described above, the data block requested to be written only once is retained in the list D2a. For example, the data of a logical block that has high read frequency but may not be said to have high overwriting frequency is retained in the list D2a. Therefore, the data block that does not suit the original purpose of retaining data blocks that tend to be overwritten occupies part of the list D2a. As a result, efficiency of management of the cache region is degraded, and the effect of reduction of the number of times of writeback to the DE 300 is impaired.

The cache managing method according to the second embodiment will be described in the following. In the present embodiment, a list for managing data blocks for which a read hit is considered to tend to occur and a list for managing dirty data are provided as lists independent of each other. Thereby, read frequency does not affect determination of a tendency to be overwritten, and thus the number of times of writeback of logical blocks that tend to be overwritten may be certainly reduced.

Figure 6:
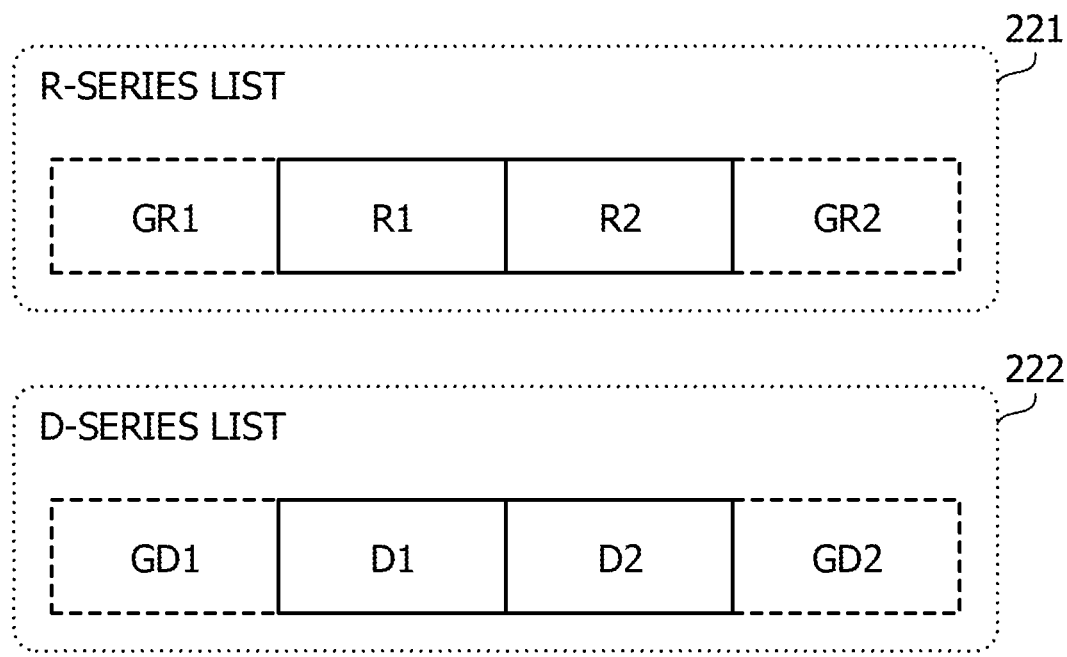
FIG. 6 is a diagram illustrating an example of entry lists used in the second embodiment.

FIG. 6 is a diagram illustrating an example of entry lists used in the second embodiment. The present embodiment uses an R-series list 221 and a D-series list 222. The R-series list 221 is a list of entries corresponding to data blocks for which a read hit is considered to tend to occur. The D-series list 222 is a list of entries corresponding to dirty data.

Here, an entry is the metadata of a data block stored in the cache region 211a, or data linked to the metadata of a data block evicted from the cache region 211a.

In addition, entries belonging to the R-series list 221 and entries belonging to the D-series list 222 are independent of each other. Therefore, an entry linked to the metadata of a same data block may be not only present in only one of the R-series list 221 and the D-series list 222 but also present in both of these lists. Hereinafter, an entry belonging to the R-series list 221 may be described as an "R-series entry," and an entry belonging to the D-series list 222 may be described as a "D-series entry."

The R-series list 221 includes lists R1, R2, GR1, and GR2. The D-series list 222 includes lists D1, D2, GD1, and GD2. The lists R1, R2, GR1, GR2, D1, D2, GD1, and GD2 are each managed on an LRU basis.

The lists R1 and R2 are lists to which mainly entries corresponding to data blocks stored in the cache region 211a in response to a read request belong. When a data block corresponding to an entry not present in the R-series list 221 is requested to be read, an entry corresponding to the data block is added to the head (most recently used (MRU) side) of the list R1. In addition, when a data block corresponding to an entry present in the list R1 is requested to be read, the entry is moved to the head (MRU side) of the list R2.

Further, also when a data block corresponding to an entry present in the list R2 is requested to be read, the entry is moved to the head of the list R2.

As a result of such control, the list R1 is managed based on Recency, and the list R2 is managed based on Popularity (or Frequency). For example, the list R1 retains an entry corresponding to a data block requested to be read once from a state in which the corresponding entry is not present in the R-series list 221. On the other hand, the list R2 retains an entry corresponding to a data block requested to be read twice or more from a state in which the corresponding entry is not present in the R-series list 221, for example, a data block hit once or more in the lists R1 and R2. Hence, the list R2 retains entries corresponding to data blocks considered to have high read frequency.

Entries evicted from the list R1 are added to the list GR1. Entries evicted from the list R2 are added to the list GR2. In addition, when a data block corresponding to an entry present in one of the lists GR1 and GR2 is requested to be read, the entry is moved to the head of the list R2.

The lists D1 and D2 are lists to which entries corresponding to data blocks stored in the cache region 211a in response to a write request belong. When a data block corresponding to an entry not present in the D-series list 222 is requested to be written, the entry corresponding to the data block is added to the head (MRU side) of the list D1. In addition, when a data block corresponding to an entry present in the list D1 is requested to be written so as to be overwritten, the entry is moved to the head (MRU side) of the list D2. Further, also when a data block corresponding to an entry present in the list D2 is requested to be written so as to be overwritten, the entry is moved to the head of the list D2.

As a result of such control, the list D1 is managed based on Recency, and the list D2 is managed based on Popularity (or Frequency). For example, the list D1 retains an entry corresponding to a data block requested to be written once from a state in which the corresponding entry is not present in the D-series list 222. On the other hand, the list D2 retains an entry corresponding to a data block requested to be written twice or more from a state in which the corresponding entry is not present in the D-series list 222, for example, a data block hit once or more in the lists D1 and D2. Hence, the list D2 retains entries corresponding to data blocks considered to have high write frequency.

Entries evicted from the list D1 are added to the list GD1. Entries evicted from the list D2 are added to the list GD2. In addition, when a data block corresponding to an entry present in one of the lists GD1 and GD2 is requested to be written, the entry is moved to the head of the list D2.

Here, data blocks corresponding to entries belonging to the lists D1 and D2 are written back to the DE 300 in given timing of being evicted from the lists D1 and D2 to the lists GD1 and GD2 or the like. In writeback from the list D1, a data block not updated after being stored in the cache region 211a is written back. In writeback from the list D2, on the other hand, a data block updated once or more after being stored in the cache region 211a is written back. Therefore, the relative number of times of writing (writeback) to the DE 300 with respect to the number of times of writing from the host device 400 for the same logical block is smaller in the case of the list D2 than in the case of the list D1.

For example, because entries corresponding to the data of logical blocks with high update frequency are retained in the list D2, control is performed so as not to write back such data to the DE 300 for as long a time as possible. Thus, the number of times of actual writing to the DE 300 may be reduced from a total number of times of writing from the host device 400.

Incidentally, suppose in the present embodiment that the lists R1 and R2 may retain entries corresponding to not only data blocks requested to be read but also data blocks requested to be written. For example, when a data block whose corresponding entry is not present in any of the lists R1, R2, D1, and D2 is requested to be written, an entry corresponding to the data block is added not only to the list D1 but also to the list R1. A reason for adding the entry to the list R1 is that a data block requested to be written may be subsequently requested to be read, and may therefore also be considered to be a data block for which a read hit tends to occur. In addition, when the data block is further requested to be read, the entry corresponding to the data block is moved from the list R1 to the list R2 as in a case of an ordinary read hit.

Because such control is performed, unlike H-ARC, the lists R1 and R2 may retain entries corresponding to dirty data. However, when the lists R1 and R2 retain an entry corresponding to dirty data, an entry corresponding to the dirty data is certainly retained in one of the lists D1 and D2.

Figure 7:
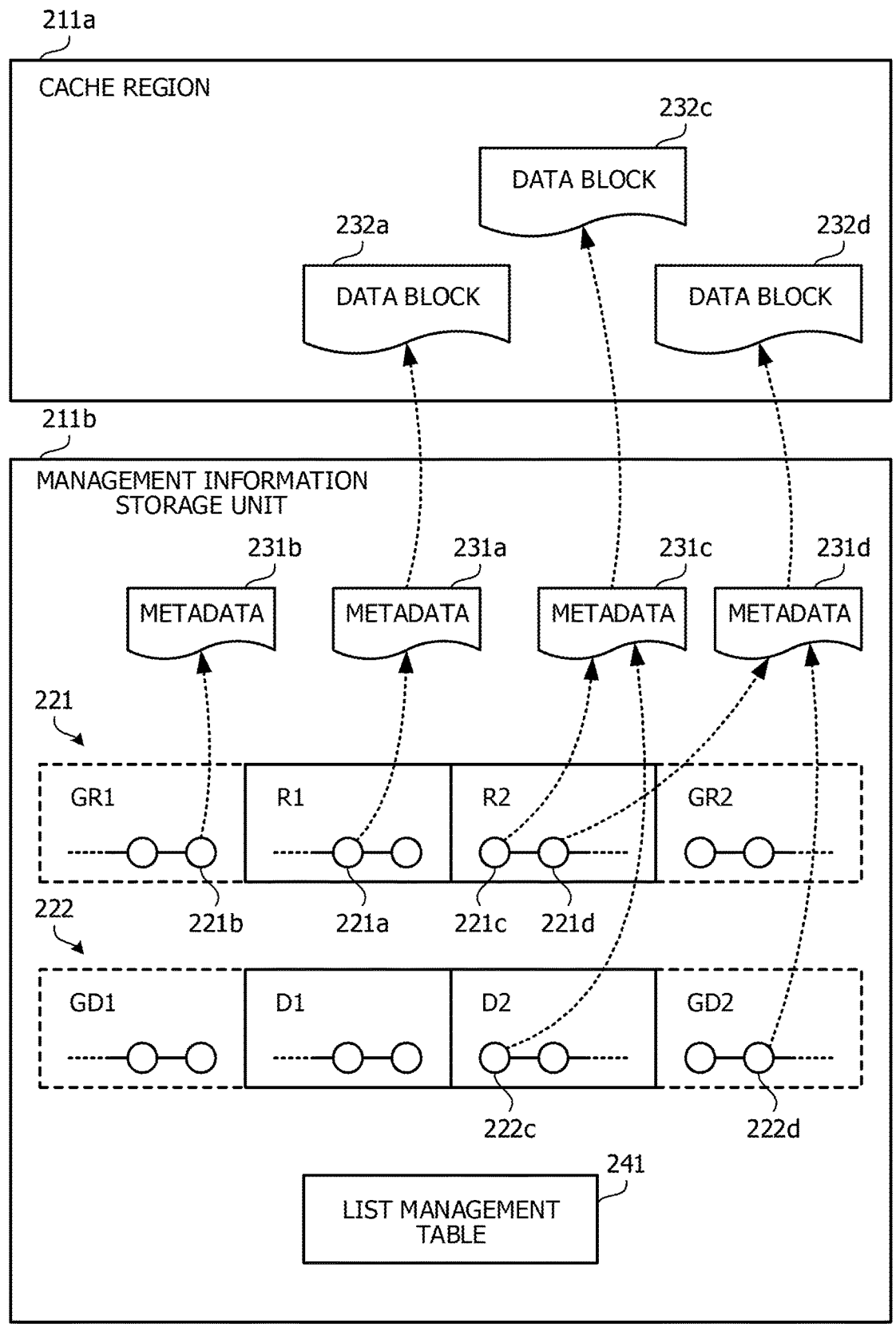
FIG. 7 is a diagram of assistance in explaining a method of managing an R-series list and a D-series list.

FIG. 7 is a diagram of assistance in explaining a method of managing an R-series list and a D-series list. As described earlier, entries included in the R-series list 221 and the D-series list 222 are data linked to the metadata of data blocks. Each entry, for example, includes link information to the metadata and pointers to a preceding entry and a following entry in the list to which the entry itself belongs.

As illustrated in FIG. 7, each entry belonging to the R-series list 221, each entry belonging to the D-series list 222, and metadata linked from the entries are stored in the management information storage unit 211b. Incidentally, at least metadata whose corresponding data blocks are stored in the cache region 211a may be stored in the cache region 211a together with the corresponding data blocks. The management information storage unit 211b also stores list management tables 241 for managing the R-series list 221 and the D-series list 222.

Figure 8:
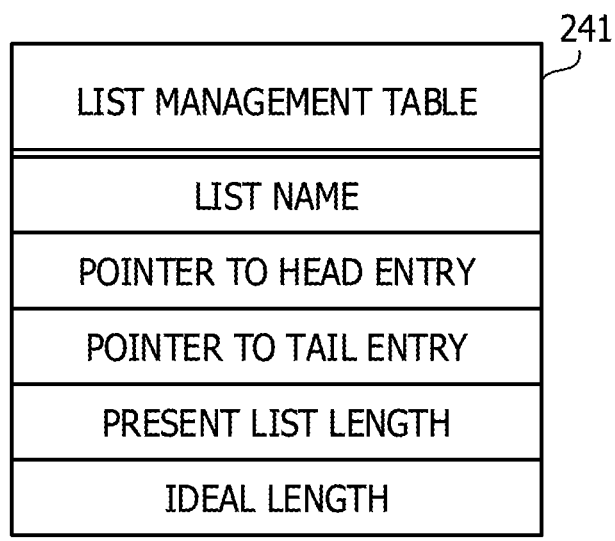
FIG. 8 is a diagram illustrating an example of data configuration of a list management table.

FIG. 8 is a diagram illustrating an example of data configuration of a list management table. The following information is registered in a list management table 241 for each of the lists R1, R2, GR1, GR2, D1, D2, GD1, and GD2. Registered in the list management table 241 are, for example, a list name for identifying the corresponding list, a pointer to a head entry on the list, a pointer to a tail entry on the list, a present list length, and an ideal length. The ideal length is the target value of an ideal list length obtained by a calculation to be described later. Incidentally, the present list length and the ideal length are expressed by the number of entries belonging to the list. In addition, the ideal length is not set in the list management tables 241 each corresponding to the lists GR1, GR2, GD1, and GD2.

Returning to FIG. 7, description will be continued in the following.

In H-ARC described earlier, an entry corresponding to a certain data block may belong to only one of lists each corresponding to the lists C1, C2, D1a, and D2a and the lists GC1, GC2, GD1a, and GD2a. On the other hand, in the present embodiment, entries belonging to the R-series list 221 and entries belonging to the D-series list 222 are independent of each other. Then, an entry corresponding to a certain data block may belong to only the R-series list 221, may belong to only the D-series list 222, or may belong to both the R-series list 221 and the D-series list 222.

For example, in FIG. 7, only an entry 221a belonging to the list R1 is present as an entry corresponding to metadata 231a. In addition, only an entry 221b present in the list GR1 is present as an entry corresponding to metadata 231b. On the other hand, an entry 221c belonging to the list R2 and an entry 222c belonging to the list D2 are present as entries corresponding to metadata 231c. In addition, an entry 221d belonging to the list R2 and an entry 222d belonging to the list GD2 are present as entries corresponding to metadata 231d.

Figure 9:
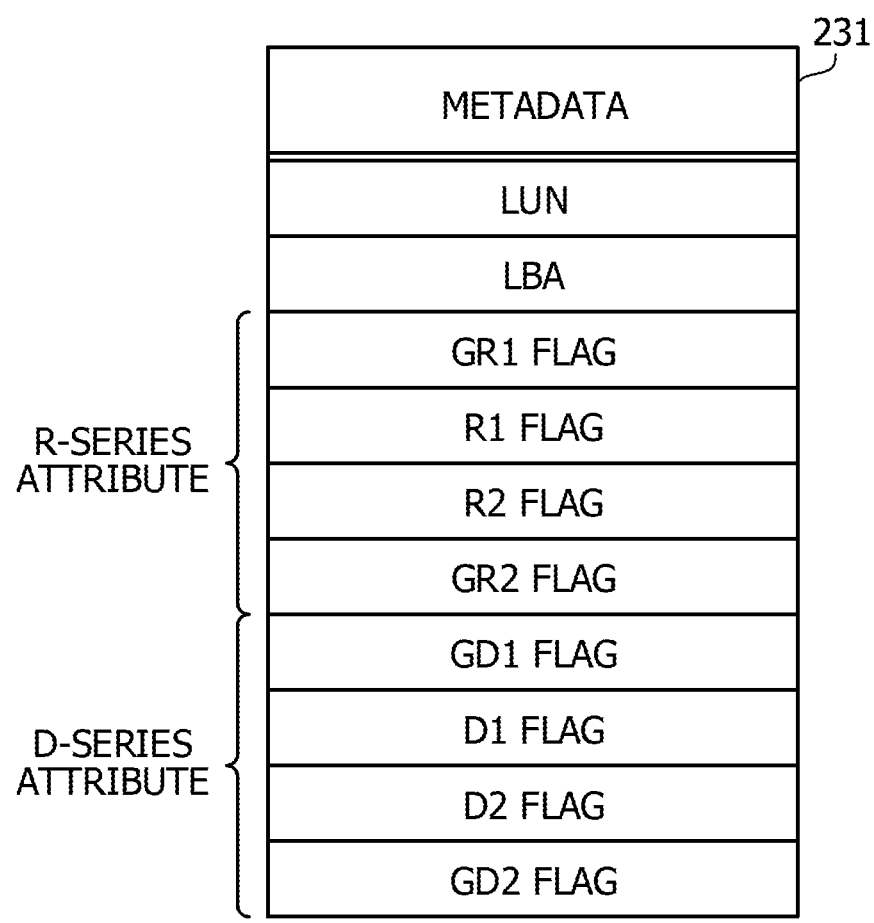
FIG. 9 is a diagram illustrating an example of data configuration of metadata.

FIG. 9 is a diagram illustrating an example of data configuration of metadata. Registered in metadata 231 are, for example, an LUN, an LBA, a GR1 flag, an R1 flag, an R2 flag, a GR2 flag, a GD1 flag, a D1 flag, a D2 flag, and a GD2 flag.

The LUN indicates the identification number of a logical volume. The LBA indicates the identification number of a logical block on the logical volume. The metadata 231 is information generated for each data block, and a corresponding data block is identified by the LUN and the LBA.

The GR1 flag indicates whether or not a corresponding entry belongs to the list GR1. The R1 flag indicates whether or not a corresponding entry belongs to the list R1. The R2 flag indicates whether or not a corresponding entry belongs to the list R2. The GR2 flag indicates whether or not a corresponding entry belongs to the list GR2.

When an entry corresponding to the metadata 231 belongs to the R-series list 221, one of the GR1 flag, the R1 flag, the R2 flag, and the GR2 flag is set to "1," and the other flags are set to "0." It is to be noted that a value of "1" indicates that an entry belongs to the corresponding list. When no entry corresponding to the metadata 231 belongs to the R-series list 221, on the other hand, the GR1 flag, the R1 flag, the R2 flag, and the GR2 flag are each set to "0."

The GD1 flag indicates whether or not a corresponding entry belongs to the list GD1. The D1 flag indicates whether or not a corresponding entry belongs to the list D1. The D2 flag indicates whether or not a corresponding entry belongs to the list D2. The GD2 flag indicates whether or not a corresponding entry belongs to the list GD2.

When an entry corresponding to the metadata 231 belongs to the D-series list 222, one of the GD1 flag, the D1 flag, the D2 flag, and the GD2 flag is set to "1," and the other flags are set to "0." When no entry corresponding to the metadata 231 belongs to the D-series list 222, on the other hand, the GD1 flag, the D1 flag, the D2 flag, and the GD2 flag are each set to "0."

As described above, the GR1 flag, the R1 flag, the R2 flag, and the GR2 flag indicate the belonging state of a corresponding entry in the R-series list 221, and the GD1 flag, the D1 flag, the D2 flag, and the GD2 flag indicate the belonging state of a corresponding entry in the D-series list 222. For example, the GR1 flag, the R1 flag, the R2 flag, and the GR2 flag indicate an R-series attribute added to the data block corresponding to the metadata 231, and the GD1 flag, the D1 flag, the D2 flag, and the GD2 flag indicate a D-series attribute added to the data block. Then, the cache control unit 213 manipulates two kinds of R-series and D-series attributes for data blocks stored in the cache region 211a or evicted from the cache region 211a. The cache control unit 213 thereby controls processing of storing data into the cache region 211a and evicting data from the cache region 211a.

Returning to FIG. 7, description will be continued in the following.

A data block corresponding to metadata having a corresponding entry belonging to at least one of the lists R1, R2, D1, and D2 is stored in the cache region 211a. For example, a data block 232a corresponding to the metadata 231a linked from the entry 221a on the list R1 is stored in the cache region 211a. In addition, a data block 232c corresponding to the metadata 231c linked from the entry 221c on the list R2 and the entry 222c on the list D2 is stored in the cache region 211a. Further, a data block 232d corresponding to the metadata 231d linked from the entry 221d on the list R2 is stored in the cache region 211a.

On the other hand, a data block corresponding to metadata having a corresponding entry belonging to at least one of the lists GR1, GR2, GD1, and GD2 but having no corresponding entry belonging to any of the lists R1, R2, D1, and D2 is not present in the cache region 211a. For example, a data block corresponding to the metadata 231b linked only from the entry 221b belonging to the list GR1 is not present in the cache region 211a.

Thus, real data corresponding to entries belonging to the lists R1, R2, D1, and D2 are certainly stored in the cache region 211a. However, real data corresponding to entries belonging to the lists GR1, GR2, GD1, and GD2 may not be stored in the cache region 211a.

In addition, from the structure as described above, a case where a data block is evicted from the cache region 211a is the following case. When an entry corresponding to a data block stored in the cache region 211a is evicted from one of the lists R1 and R2, and no entry corresponding to the data block is present in any of the lists D1 and D2, the data block is evicted from the cache region 211a. In addition, when an entry corresponding to a data block stored in the cache region 211a is evicted from one of the lists D1 and D2, and no entry corresponding to the data block is present in any of the lists R1 and R2, the data block is evicted from the cache region 211a. At this time, when the evicted data block is in a dirty state, the data block is written back.

Incidentally, in the following description, the lists R1, R2, D1, and D2 may be referred to as "cache lists," and the lists GR1, GR2, GD1, and GD2 may be referred to as "ghost lists." In addition, the presence of an entry corresponding to a data block requested to be accessed in at least one of the lists R1, R2, D1, and D2 may be referred to as a "cache hit." On the other hand, the presence of an entry corresponding to a data block requested to be read in one of the lists GR1 and GR2 may be referred to as a "ghost hit." In addition, the presence of an entry corresponding to a data block requested to be written in one of the lists GD1 and GD2 may also be similarly referred to as a "ghost hit."

Here, as described with reference to FIG. 7, entries in the R-series list 221 and entries in the D-series list 222 are managed independently of each other. By using such a managing method, the cache control unit 213 may control the manipulation of the D-series list 222 according to write frequency completely separately from read frequency. The above-described problems in H-ARC may therefore be solved.

Figure 10A:
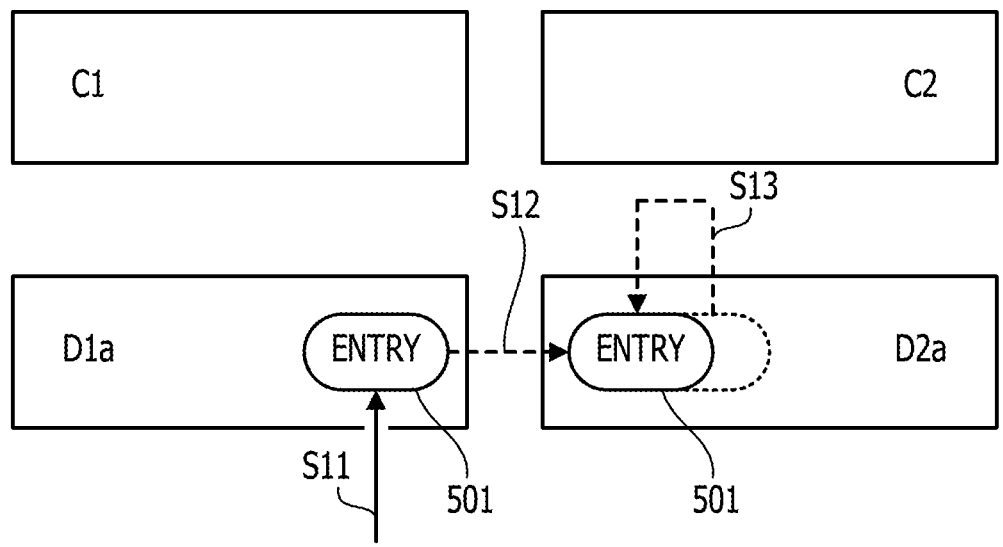
FIGS. 10A and 10B are diagrams illustrating an example of list manipulation.
Figure 10B:
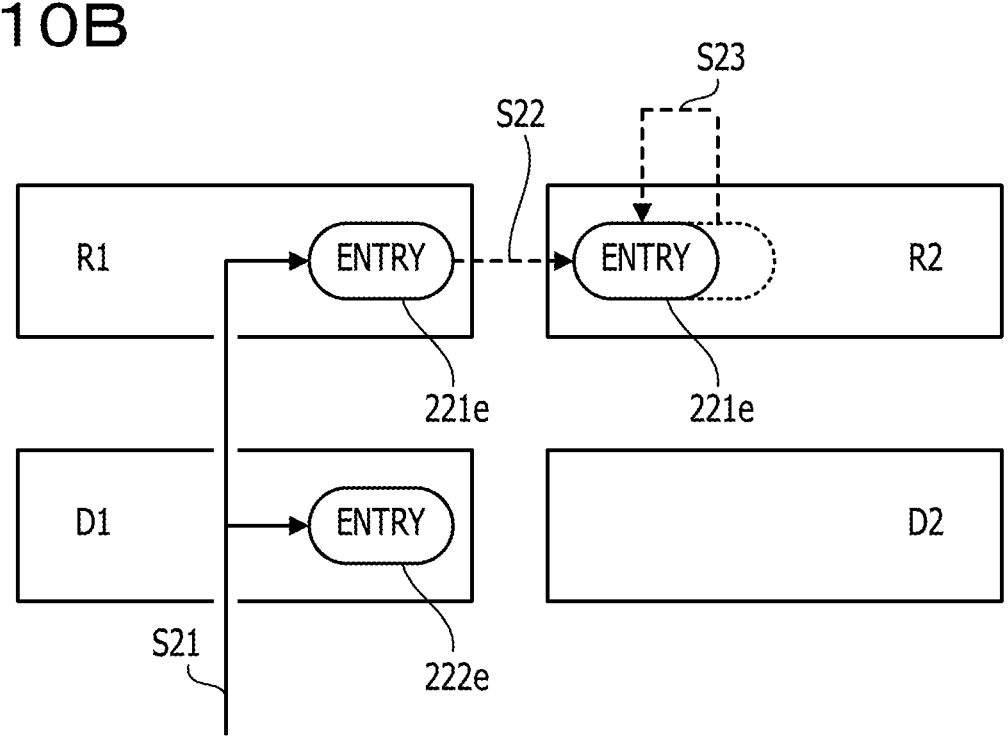

FIGS. 10A and 10B are diagrams illustrating an example of list manipulation. FIGS. 10A and 10B represent a case where a write request, a read request, and a read request are issued in order for a data block having no corresponding entry on the lists. FIG. 10A illustrates a case where H-ARC is used. FIG. 10B illustrates a case of the second embodiment.

In the case where H-ARC is used, as illustrated in FIG. 10A, when the above-described data block is first requested to be written, an entry 501 corresponding to the logical block is added to the head of the list D1a (step S11). When the same data block is thereafter requested to be read in the state in which the entry 501 is present in the list D1a, the entry 501 is moved to the head of the list D2a (step S12). When the same data block is further requested to be read in the state in which the entry 501 is present in the list D2a, the entry 501 is moved to the head of the list D2a again (step S13). Thus, in H-ARC, the entry 501 corresponding to the data block that is requested to be written only once and which therefore may not be said to have high overwriting frequency continues to be retained in the list D2a.

On the other hand, in the present embodiment, as illustrated in FIG. 10B, when the above-described data block is first requested to be written, an entry 222e corresponding to the data block is added to the head of the list D1. At the same time, an entry 221e corresponding to the same data block is also added to the head of the list R1 (step S21). Suppose that the same data block is thereafter requested to be read in the state in which the entries 221e and 222e are present in the lists R1 and D1, respectively. At this time, the entry 221e on the list R1 is moved to the head of the list R2 (step S22). However, the entry 222e on the list D1 is not moved, but remains on the list D1. Suppose that the same data block is further requested to be read in the state in which the entries 221e and 222e are present in the lists R2 and D1, respectively. At this time, the entry 221e on the list R2 is moved to the head of the list R2 again (step S23). However, also in this case, the entry 222e on the list D1 is not moved, but remains on the list D1.

When a read is requested as in steps S22 and S23 described above, entry movement on the R-series list 221 is performed, but entry movement on the D-series list 222 is not performed. Therefore, the entry 222e remains in the list D1 as an entry corresponding to the data block requested to be written only once, and is not moved to the list D2 for retaining entries corresponding to data blocks requested to be written twice or more. Hence, only entries corresponding to data blocks considered to tend to be overwritten may be certainly retained in the list D2. As a result, efficiency of management of the cache region 211a is improved, and the effect of reduction of the number of times of writeback to the DE 300 is not impaired.

Description will next be made of a case where states of belonging of entries to lists are expressed by cache page types. Incidentally, suppose that the size of a cache page is the same as the size of a logical block.

FIG. 11 is a diagram illustrating an example of a page classification table. A page classification table 601 includes an R-series item, a D-series item, and a page type item. The R-series item indicates a list within the R-series list 221, to which list within the R-series list 221 an entry corresponding to a data block within a cache page belongs. The D-series item indicates a list within the D-series list 222, to which list within the D-series list 222 an entry corresponding to the data block within the cache page belongs. The page type item indicates a type of cache page.

The page classification table 601 is a table that classifies cache pages according to states of belonging, to lists, entries corresponding to data blocks stored in the cache pages within the cache region 211a. For example, a page type "Cross" is a state in which a corresponding entry belongs to one of the lists R1 and R2 and a corresponding entry belongs to one of the lists D1 and D2. A page type "Buffer" is a state in which a corresponding entry belongs to one of the lists D1 and D2 but no corresponding entry belongs to at least either of the lists R1 and R2 in the R-series list 221. A page type "Clean" is a state in which a corresponding entry belongs to one of the lists R1 and R2 but no corresponding entry belongs to at least either of the lists D1 and D2 in the D-series list 222. Incidentally, a page type "-" indicates that the data block is not stored in a cache page, and that there is thus no corresponding cache page.

Description will next be made of transitions of page types.

FIG. 12 is a diagram illustrating an example of a transition table in I/O processing. A transition table 602 in I/O processing includes items of an I/O type, a page type before a transition, and a page type after the transition. The item of an I/O type indicates which of a read request and a write request is made. The item of a page type before a transition indicates a page type before a transition. The item of a page type after the transition indicates a page type after the transition.

For example, a third row in the transition table 602 illustrates an I/O type "Read," a page type "Buffer" before a transition, and a page type "Cross" after the transition. This indicates that when a data block stored in a cache page of the page type "Buffer" is requested to be read, a corresponding entry is registered into the list R1 or the list R2, and the page type thereby makes a transition to "Cross."

Here, according to a second row in the above-described transition table 602, when a read is requested in a case where the page type before a transition is "Clean," a corresponding entry is moved to the list R2 in the R-series list 221. However, entry movement is not performed in the D-series list 222, and no corresponding entry is registered in any of the lists D1 and D2. Therefore, the page type remains "Clean" and is unchanged. Because the D-series list 222 is thus not changed when a read is requested, an entry corresponding to a data block that does not suit the purpose of the list D2 is not registered in the list D2.

FIG. 13 is a diagram illustrating an example of a transition table in page release determination. A transition table 603 in page release determination includes items of a series, a page type before a transition, and a page type after the transition. The item of a series indicates from which of an R-series cache list and a D-series cache list an entry is evicted. The item of a page type before a transition indicates a page type before a transition. The item of a page type after the transition indicates a page type after the transition.

As indicated in the transition table 603, when an entry corresponding to a data block stored in a cache page of the page type "Cross" is evicted from an R-series or D-series cache list, an entry corresponding to the data block remains in an R-series or D-series cache list. Therefore, the data block remains in the cache page, and the cache page is not released.

On the other hand, when an entry corresponding to a data block stored in a cache page of the page type "Clean" or "Buffer" is evicted from an R-series or D-series cache list, no entry corresponding to the data block remains in any of the R-series and D-series cache lists. Therefore, the data block is evicted from the cache region 211a, and the corresponding cache page is released. Incidentally, when an entry corresponding to a data block stored in a cache page of the page type "Buffer" is evicted from a D-series cache list, and the data block is in a dirty state, the data block is written back.

Description will next be made of a method of adjusting the size of the cache lists.

Figure 14:
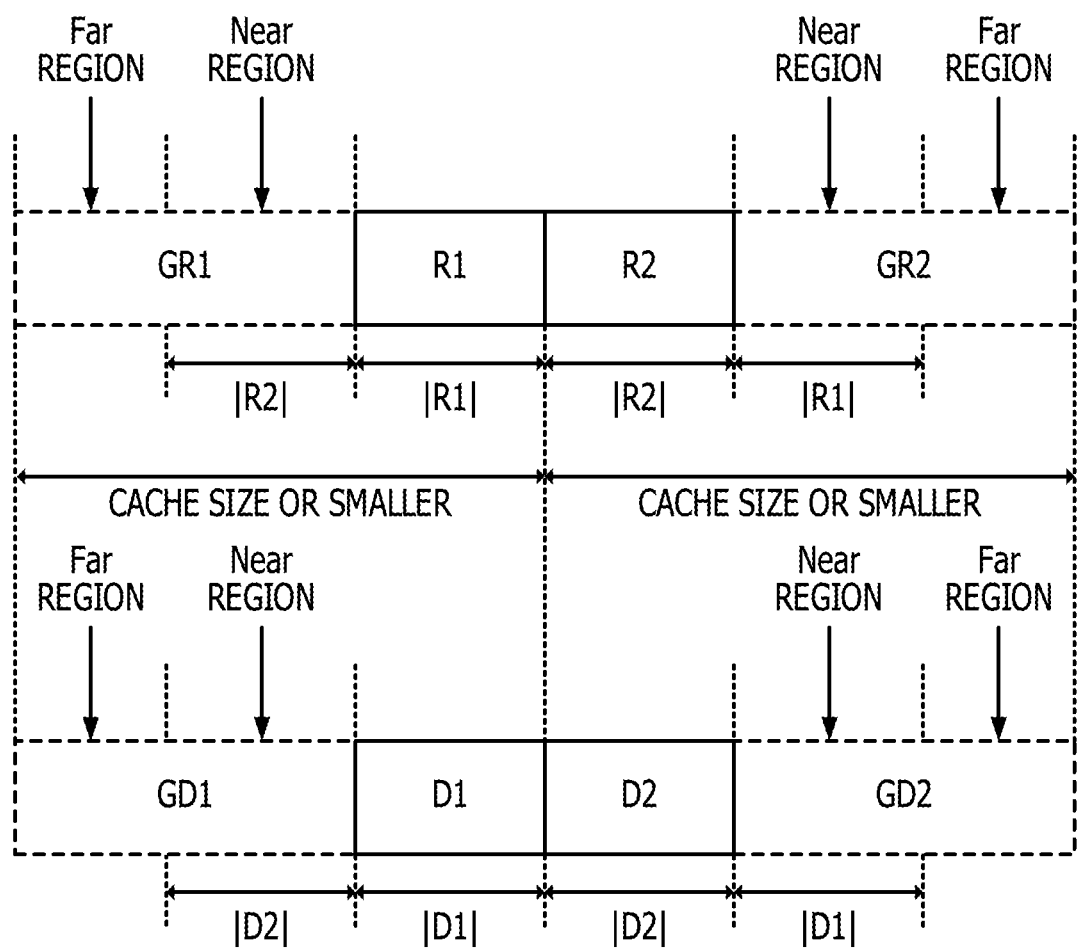
FIG. 14 is a diagram illustrating an example of a method of adjusting a size of cache lists.

FIG. 14 is a diagram illustrating an example of a method of adjusting a size of cache lists.

As illustrated in FIG. 8, the list management tables 241 retain a present list length and an ideal length for each of the cache lists, for example, the lists R1, R2, D1, and D2. The ideal length is the target value of a list length. The cache control unit 213 adjusts ideal lengths when a ghost hit occurs. In addition, because the ghost hit necessitates moving a hit entry on a ghost list onto a cache list, an entry needs to be evicted from one of the cache lists. The cache control unit 213 determines from which of the lists R1, R2, D1, and D2 to evict an entry after adjusting the ideal lengths. At this time, the CM 210 determines the entry to be evicted such that the present list lengths approach the ideal lengths. For example, the CM 210 evicts an entry from a list having a largest absolute value of a difference between the ideal length and the present list length.

Here, in H-ARC, a total size of the lists C1, C2, D1a, and D2a coincides with the size of the cache region. In the present embodiment, however, entries corresponding to data blocks within the cache region 211a may belong to both the R-series list 221 and the D-series list 222. Therefore, a total size of the lists R1, R2, D1, and D2 may be larger than the size of the cache region 211a. Hence, it is difficult to use an ideal length calculating method similar to that of H-ARC.

Accordingly, in the present embodiment, each of the ghost lists, for example, the lists GR1, GR2, GD1, and GD2 is divided into a Far region and a Near region. Then, when a ghost hit occurs, the cache control unit 213 adjusts ideal lengths according to which ghost list is hit and which of the Far region and the Near region includes a hit entry.

Suppose that in FIG. 14, the head (MRU side) of each of the lists R1, GR1, D1, and GD1 is a right side in FIG. 14. In addition, suppose that the head side (MRU side) of each of the lists R2, GR2, D2, and GD2 is a left side in FIG. 14. In addition, |R1|, |R2|, |GR1|, |GR2|, |D1|, |D2|, |GD1|, and |GD2| denote the present list lengths of the lists R1, R2, GR1, GR2, D1, D2, GD1, and GD2, respectively.

As illustrated in FIG. 14, a region having the length |R2| on the head side in the list GR1 is set as a Near region, and a region having the length |R1| on the head side in the list GR2 is set as a Near region. Here, a total size of the lists R1 and R2 is a cache size (size of the cache region 211a) at a maximum. In this case, a total size of the lists R1 and GR1 and a total size of the lists R2 and GR2 are each the cache size at a maximum.

In addition, a region having the length |D2| on the head side in the list GD1 is set as a Near region, and a region having the length |D1| on the head side in the list GD2 is set as a Near region. Here, a total size of the lists D1 and D2 is the cache size at a maximum. In this case, a total size of the lists D1 and GD1 and a total size of the lists D2 and GD2 are each the cache size at a maximum.

In the following, a list length adjusting method in a case where a ghost hit occurs in the list GR1 will be described as an example.

The occurrence of a ghost hit in the list GR1 means that the list length of the adjacent list R1 needs to be increased. However, an entry in the Near region of the list GR1 has a short time since being evicted from the list R1 as compared with an entry in the Far region. It is therefore considered that an entry hit in the Near region could have been moved to the list R2 before being evicted from the list R1 if the list R1 were slightly larger. Hence, when the Near region is hit, there is considered to be a lower necessity for greatly increasing the list length of the list R1 than when the Far region is hit.

It may be considered from such a viewpoint that when the Near region of the list GR1 is hit, there is a low necessity for increasing the size of the whole of the cache lists, for example, the total size of the lists R1 and R2. Accordingly, when the Near region of the list GR1 is hit, the cache control unit 213 increases the ideal length of the list R1 and decreases the ideal length of the list R2 without changing a total value of the respective ideal lengths of the lists R1 and R2.

When the Far region of the list GR1 is hit, on the other hand, it may be considered that there is a high necessity for increasing the size of the whole of the cache lists, for example, the total size of the lists R1 and R2. Accordingly, the cache control unit 213 increases the ideal length of the list R1, and decreases the ideal length of one of the lists D1 and D2.

Here, suppose that the respective ideal lengths of the lists D1 and D2 are Ld1 and Ld2. When (Ld1−|D1|) is equal to or more than (Ld2−|D2|), for example, the cache control unit 213 decreases the ideal length Ld1 of the list D1. When (Ld1−|D|) is less than (Ld2−|D2|), the cache control unit 213 decreases the ideal length Ld2 of the list D2.

Incidentally, when an entry in the list GR1 is hit as described above, the entry is added to the list R2. At this time, the cache control unit 213 evicts a tail end (LRU side) entry from one of the cache lists. For example, the cache control unit 213 evicts a tail end entry from one of the lists R1 and R2. At this time, the cache control unit 213 determines from which of the lists R1 and R2 to evict a tail end entry such that the lengths of the lists R1 and R2 each approach the ideal lengths of the lists R1 and R2 after adjustment.

The above description has been made of an ideal length adjusting method in a case where a ghost hit occurs in the list GR1. As for cases where a ghost hit occurs in the other lists, ideal lengths may be adjusted according to an ideal length increase and decrease table illustrated in next FIG. 15.

FIG. 15 is a diagram illustrating an example of an ideal length increase and decrease table. Incidentally, the ideal length increase and decrease table 242 illustrated in FIG. 15 may, for example, be stored in the management information storage unit 211b and referred to by the cache control unit 213 at a time of adjustment of ideal lengths.

The ideal length increase and decrease table 242 includes items of a ghost list, a hit region, a decrease in ideal length, and an increase in ideal length. The item of a ghost list indicates the list name of a hit ghost list. The item of a hit region indicates which of the Near region and the Far region of the ghost list is hit. The item of a decrease in ideal length indicates the list name of a cache list whose ideal length is decreased. The item of an increase in ideal length indicates the list name of a cache list whose ideal length is increased.

For example, the ideal length increase and decrease table 242 illustrates a ghost list "GR2," a hit region "Far region," a decrease in ideal length of "D1 or D2," and an increase in ideal length of "R2." This indicates that when a ghost hit occurs in the Far region of the list GR2, the cache control unit 213 decreases the ideal length of the list D1 or the list D2 and increases the ideal length of the list R2.

In addition, for example, the ideal length increase and decrease table 242 illustrates a ghost list "GD1," a hit region "Far region," a decrease in ideal length of "R1 or R2," and an increase in ideal length of "D1." This indicates that when a ghost hit occurs in the Far region of the list GD1, the cache control unit 213 decreases the ideal length of the list R1 or the list R2 and increases the ideal length of the list D1. Here, whether to decrease the ideal length of the list R1 or the ideal length of the list R2 is determined by the following method, for example. Incidentally, suppose that the respective ideal lengths of the lists R1 and R2 are Lr1 and Lr2. When (Lr1−|R1|) is equal to or more than (Lr2−|R2|), the cache control unit 213 decreases the ideal length Lr1 of the list R1. When (Lr1−|R1|) is less than (Lr2−|R2|), the cache control unit 213 decreases the ideal length Lr2 of the list R2.

The cache control unit 213 thus adjusts the ideal length of each list according to a difference of whether a ghost hit occurs in the Near region or the Far region. Then, the cache control unit 213 determines entries to be evicted from the lists R1, R2, D1, and D2 such that the respective list lengths of the lists R1, R2, D1, and D2 approach the corresponding ideal lengths. The respective list lengths of the lists R1, R2, D1, and D2 are thereby adjusted appropriately.

For example, when there are considered to be many data blocks requested to be read, the size of the R-series cache lists is enlarged. Further, when there are considered to be many data blocks having high read frequency, the size of the list R2 is enlarged. The probability of a read hit may be consequently increased. In addition, when there are considered to be many data blocks requested to be written, the size of the D-series cache lists is enlarged. Further, when there are considered to be many data blocks having high overwriting frequency, the size of the list D2 is enlarged. The number of times of writeback of data blocks having high overwriting frequency may be consequently reduced.

Processing performed by the CM 210 will next be described with reference to flowcharts.

Figure 16:
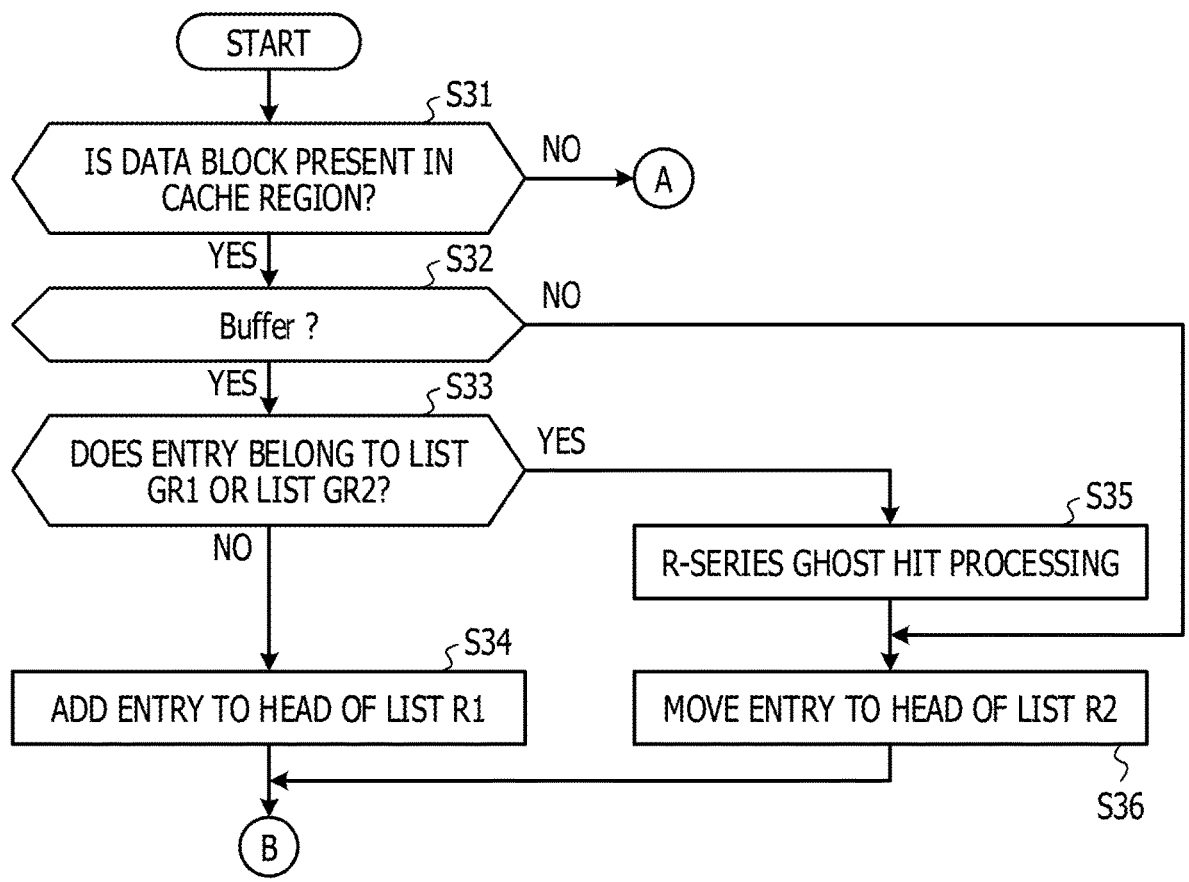
FIG. 16 is a flowchart (1) illustrating an example of cache control processing.

FIG. 16 is a flowchart (1) illustrating an example of cache control processing. The processing of FIG. 16 is started when the host I/O processing unit 212 receives an access request from the host device 400. The processing illustrated in FIG. 16 will be described in the following along step numbers.

(S31) The cache control unit 213 determines whether or not the data of a logical block (data block) requested to be accessed is present in the cache region 211a. When the data block is present, the cache control unit 213 advances the processing to step S32. When the data block is not present (in a case of a cache miss), the cache control unit 213 advances the processing to step S51.

(S32) The cache control unit 213 determines whether or not the page type of a cache page storing the data block requested to be accessed is Buffer. When the page type is Buffer, the cache control unit 213 advances the processing to step S33. When the page type is other than Buffer, the cache control unit 213 advances the processing to step S36.

(S33) The cache control unit 213 determines whether or not an entry corresponding to the data block requested to be accessed belongs to the list GR1 or the list GR2. When the entry belongs to the list GR1 or the list GR2, the cache control unit 213 advances the processing to step S35. When the entry does not belong to any of the lists GR1 and GR2, the cache control unit 213 advances the processing to step S34.

(S34) This is a case where the D-series list 222 is hit but the R-series list 221 is not hit. In this case, the cache control unit 213 adds an entry corresponding to the data block requested to be accessed to the head of the list R1. In addition, along with the addition of the entry, the cache control unit 213 updates the metadata 231 to which the entry is linked and the list management table 241. The cache control unit 213 then advances the processing to step S41.

(S35) This is a case where a read is requested and a ghost hit occurs in either the list GR1 or the list GR2. In this case, the cache control unit 213 performs R-series ghost hit processing. For example, the cache control unit 213 adjusts the respective ideal lengths of the cache lists of the R-series or cache lists of the R-series and the D-series according to the ideal length increase and decrease table 242. Then, the cache control unit 213 evicts an entry from one of the lists R1 and R2 to the ghost list based on the present list lengths of the lists R1 and R2 and the ideal lengths of the lists R1 and R2 after the adjustment.

(S36) The cache control unit 213 moves the entry corresponding to the data block requested to be accessed to the head of the list R2. In addition, along with the movement of the entry, the cache control unit 213 updates the entry, the metadata 231 to which the entry is linked, and the list management table 241. However, when "1" is set as the R2 flag of the metadata 231, the cache control unit 213 does not need to update the metadata 231. When the above processing is completed, the cache control unit 213 advances the processing to step S41.

Figure 17:
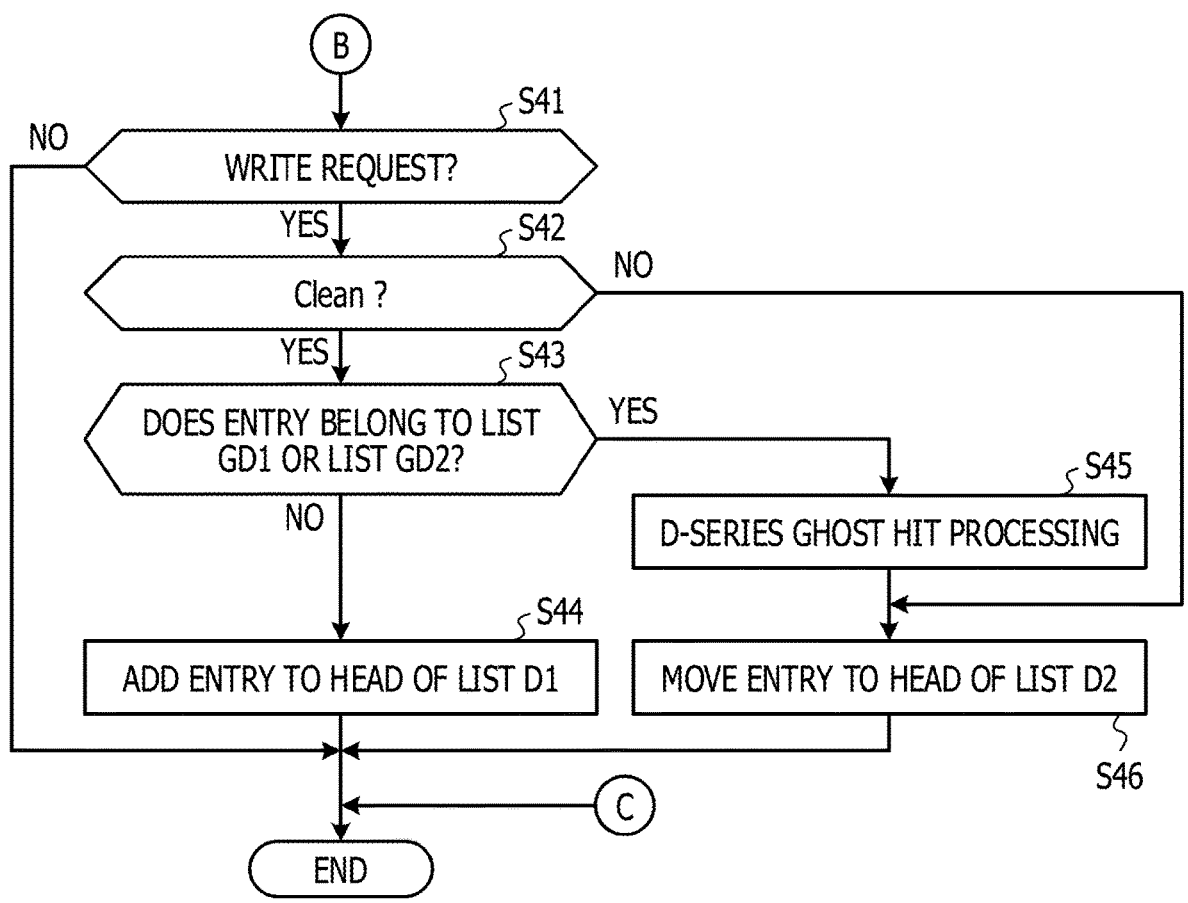
FIG. 17 is a flowchart (2) illustrating an example of cache control processing.

FIG. 17 is a flowchart (2) illustrating an example of cache control processing. The processing illustrated in FIG. 17 will be described in the following along step numbers.

(S41) The cache control unit 213 determines whether or not the access request from the host device 400 is a write request. When the access request is a write request, the cache control unit 213 advances the processing to step S42. When the access request is a read request, the cache control unit 213 ends the processing.

(S42) The cache control unit 213 determines whether or not the page type of the cache page storing the data block requested to be accessed is Clean. When the page type is Clean, the cache control unit 213 advances the processing to step S43. When the page type is other than Clean, the cache control unit 213 advances the processing to step S46.

(S43) The cache control unit 213 determines whether or not an entry corresponding to the data block requested to be accessed belongs to the list GD1 or the list GD2. When the entry belongs to the list GD1 or the list GD2, the cache control unit 213 advances the processing to step S45. When the entry does not belong to any of the lists GD1 and GD2, the cache control unit 213 advances the processing to step S44.

(S44) This is a case where the R-series list 221 is hit but the D-series list 222 is not hit. In this case, the cache control unit 213 adds an entry corresponding to the data block requested to be written to the head of the list D1. In addition, along with the addition of the entry, the cache control unit 213 updates the metadata 231 to which the entry is linked, and the list management table 241. The cache control unit 213 then ends the processing.

(S45) This is a case where a write is requested and a ghost hit occurs in either the list GD1 or the list GD2. In this case, the cache control unit 213 performs D-series ghost hit processing. For example, the cache control unit 213 adjusts the respective ideal lengths of the cache lists of the D-series or cache lists of the R-series and the D-series according to the ideal length increase and decrease table 242. The cache control unit 213 then evicts an entry from one of the lists D1 and D2 to the ghost list based on the present list lengths of the lists D1 and D2 and the ideal lengths of the lists D1 and D2 after the adjustment.

(S46) The cache control unit 213 moves the entry corresponding to the data block requested to be accessed to the head of the list D2. In addition, along with the movement of the entry, the cache control unit 213 updates the entry, the metadata 231 to which the entry is linked, and the list management table 241. However, when "1" is set as the D2 flag of the metadata 231, the cache control unit 213 does not need to update the metadata 231. When the above processing is completed, the cache control unit 213 ends the processing.

Figure 18:
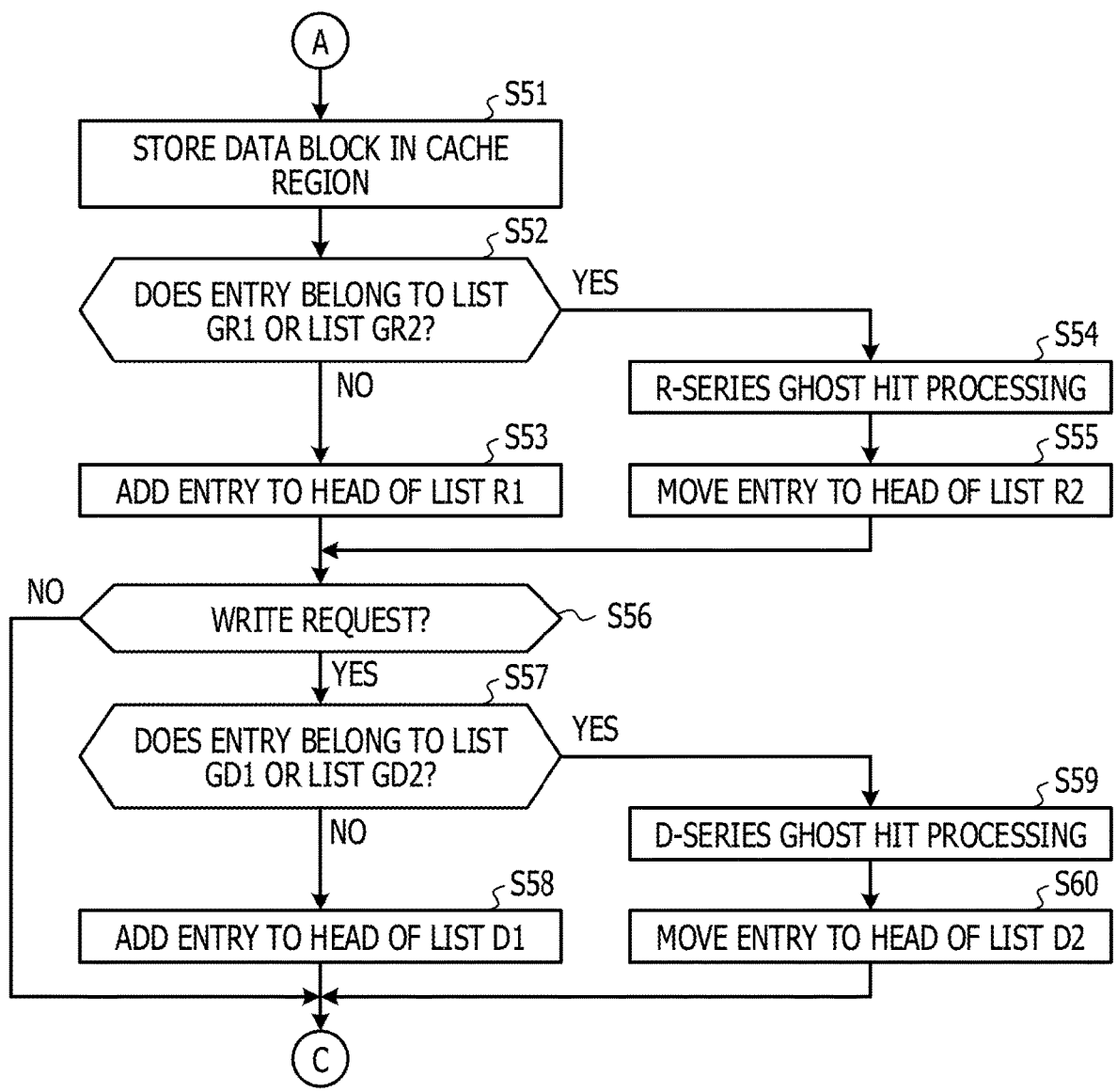
FIG. 18 is a flowchart (3) illustrating an example of cache control processing.

FIG. 18 is a flowchart (3) illustrating an example of cache control processing. The processing illustrated in FIG. 18 will be described in the following along step numbers.

(S51) The cache control unit 213 stores the data block requested to be accessed in the cache region 211a. For example, when a read is requested, the cache control unit 213 obtains the data block requested to be read from a storage device within the DE 300 via the disk I/O processing unit 214, and stores the obtained data block in the cache region 211a. When a write is requested, the cache control unit 213 stores the data block received from the host device 400 in the cache region 211a.

(S52) The cache control unit 213 determines whether or not an entry corresponding to the data block requested to be accessed belongs to the list GR1 or the list GR2. When the entry belongs to the list GR1 or the list GR2, the cache control unit 213 advances the processing to step S54. When the entry does not belong to any of the lists GR1 and GR2, the cache control unit 213 advances the processing to step S53.

(S53) The cache control unit 213 adds an entry corresponding to the data block requested to be accessed to the head of the list R1. In addition, along with the addition of the entry, the cache control unit 213 updates the metadata 231 to which the entry is linked, and the list management table 241. When there is no corresponding metadata 231, the cache control unit 213 generates the metadata 231. The cache control unit 213 then advances the processing to step S56.

(S54) The cache control unit 213 performs R-series ghost hit processing. For example, the cache control unit 213 adjusts the respective ideal lengths of the cache lists of the R-series or cache lists of the R-series and the D-series, and evicts an entry from one of the lists R1 and R2 to the ghost list based on the present list lengths of the lists R1 and R2 and the ideal lengths of the lists R1 and R2 after the adjustment.

(S55) The cache control unit 213 moves the entry corresponding to the data block requested to be accessed to the head of the list R2. In addition, along with the movement of the entry, the cache control unit 213 updates the entry, the metadata 231 to which the entry is linked, and the list management table 241. However, when "1" is set as the R2 flag of the metadata 231, the cache control unit 213 does not need to update the metadata 231.

(S56) The cache control unit 213 determines whether or not the access request from the host device 400 is a write request. When the access request is a write request, the cache control unit 213 advances the processing to step S57. When the access request is a read request, the cache control unit 213 ends the processing.

(S57) The cache control unit 213 determines whether or not an entry corresponding to the data block requested to be accessed belongs to the list GD1 or the list GD2. When the entry belongs to the list GD1 or the list GD2, the cache control unit 213 advances the processing to step S59. When the entry does not belong to any of the lists GD1 and GD2, the cache control unit 213 advances the processing to step S58.

(S58) The cache control unit 213 adds an entry corresponding to the data block requested to be accessed to the head of the list D1. In addition, along with the addition of the entry, the cache control unit 213 updates the metadata 231 to which the entry is linked, and the list management table 241. When there is no corresponding metadata 231, the cache control unit 213 generates the metadata 231. The cache control unit 213 then ends the processing.

(S59) The cache control unit 213 performs D-series ghost hit processing. For example, the cache control unit 213 adjusts the respective ideal lengths of the cache lists of the D-series or cache lists of the R-series and the D-series, and evicts an entry from one of the lists D1 and D2 to the ghost list based on the present list lengths of the lists D1 and D2 and the ideal lengths of the lists D1 and D2 after the adjustment.

(S60) The cache control unit 213 moves the entry corresponding to the data block requested to be accessed to the head of the list D2. In addition, along with the movement of the entry, the cache control unit 213 updates the entry, the metadata 231 to which the entry is linked, and the list management table 241. However, when "1" is set as the D2 flag of the metadata 231, the cache control unit 213 does not need to update the metadata 231. When the above processing is completed, the cache control unit 213 ends the processing.

Incidentally, information processing according to the first embodiment may be implemented by making the processor used in the storage control device 10 execute a program. In addition, information processing according to the second embodiment may be implemented by making the processor 210a execute a program. The programs may be recorded on a computer readable recording medium.

The programs may, for example, be distributed by circulating the recording medium on which the programs are recorded. In addition, each of programs implementing functions corresponding to the host I/O processing unit 212, the cache control unit 213, and the disk I/O processing unit 214 may be distributed separately as a separate program. The functions of the host I/O processing unit 212, the cache control unit 213, and the disk I/O processing unit 214 may be implemented by separate computers. A computer may, for example, store a program recorded on a recording medium in the RAM 210b or the SSD 210c, and read and execute the program.

All examples and conditional language recited herein are intended for pedagogical purposes to aid the reader in understanding the invention and the concepts contributed by the inventor to furthering the art, and are to be construed as being without limitation to such, for example, recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A control device configured to be coupled to a storage device, the control device comprising:
a cache memory configured to store data;
a memory configured to store a first list, a second list, a third list and a fourth list, the first list registering information indicating the data requested to be read in the cache memory, the second list registering information indicating the data requested to be written in the cache memory, the third list registering information moved from the first list and the fourth list registering information moved from the second list; and
a processor coupled to the cache memory and the memory and configured to:
when receiving a first request for reading the first data, check the first list and the second list to determine whether first information indicating the first request is registered,
when the first information is registered in the first list and the second list, move the first information from the first list to the third list and keep the first information in the second list without moving the first information to the fourth list, and
when the first information is registered in the second list and not in the first list, register the first information in the first list and keep the first information in the second list without moving the first information to the fourth list.

2. The control device according to claim 1, wherein the processor is configured to:
receive a second request for modifying the first data stored in the cache memory, and
based on the second request, move the first information from the second list to the fourth list.

3. The control device according to claim 2, wherein the processor is configured to:
receive a third request for modifying the first data stored in the cache memory, and
when the first information is registered in the fourth list, move the first information registered in the fourth list to a head position of the fourth list.

4. The control device according to claim 3, wherein the processor is configured to delete the first data from the cache memory when the first data stored in the cache memory is in a state of not being registered in any of the first to fourth lists.

5. The control device according to claim 4, wherein
the memory is configured to store a fifth list, the fifth registering information indicating data deleted from the cache memory; and
the processor is configured to:
register the first information in the fifth list, when the first data is deleted from the cache memory, and
move the first information from the fifth list to the third list when the first data is requested to be read.

6. The control device according to claim 5, wherein the processor is configured to determine a target value of a ratio between a first capacity of the first list and a third capacity of the third list.

7. The control device according to claim 6, wherein the processor is configured to determine at least one of the target value of the ratio between the first capacity and the third capacity, a target value of a ratio between the first capacity and a second capacity of the second list, and a fourth capacity of the fourth list based on a position of the first information in the fifth list when the first data is requested to be read.

8. A storage system comprising:
a storage device; and
a control device coupled to the storage device, the control device including a cache memory, a memory, and a processor, wherein
a memory configured to store a first list, a second list, a third list and a fourth list, the first list registering information indicating the data requested to be read in the cache memory, the second list registering information indicating the data requested to be written in the cache memory, the third list registering information moved from the first list and the fourth list registering information moved from the second list; and
a processor coupled to the cache memory and the memory and configured to:
when receiving a first request for reading the first data, check the first list and the second list to determine whether first information indicating the first request is registered, when the first information is registered in the first list and the second list, move the first information from the first list to the third list and keep the first information in the second list without moving the first information to the fourth list, and when the first information is registered in the second list and not in the first list, register the first information in the first list and keep the first information in the second list without moving the first information to the fourth list.

9. The storage system according to claim 8, wherein the processor is configured to:

receive a second request for modifying the first data stored in the cache memory, and based on the second request, move the first information from the second list to the fourth list.

10. The storage system according to claim 9, wherein the processor is configured to:

receive a third request for modifying the first data stored in the cache memory, and when the first information is registered in the fourth list, move the first information registered in the fourth list to a head position of the fourth list.

11. The storage system according to claim 10, wherein the processor is configured to delete the first data from the cache memory when the first data stored in the cache memory is in a state of not being registered in any of the first to fourth lists.

12. The storage system according to claim 11, wherein the memory is configured to store a fifth list, the fifth list registering information indicating data deleted from the cache memory; and the processor is configured to:

register the first information in the fifth list, when the first data is deleted from the cache memory, and move the first information from the fifth list to the third list when the first data is requested to be read.

13. The storage system according to claim 12, wherein the processor is configured to determine a target value of a ratio between a first capacity of the first list and a third capacity of the third list.

14. The storage system according to claim 13, wherein the processor is configured to determine at least one of the target value of the ratio between the first capacity and the third capacity, a target value of a ratio between the first capacity and a second capacity of the second list, and a fourth capacity of the fourth list based on a position of the first information in the fifth list when the first data is requested to be read.

15. A method using a control device coupled to a storage device, the control device including a cache memory, a memory, and processor, the method comprising:

storing data in the cache memory;

storing, in the memory, a first list, a second list, a third list and a fourth list, the first list registering information indicating the data requested to be read in the cache memory, the second list registering information indicating the data requested to be written in the cache memory, the third list registering information moved from the first list and the fourth list registering information moved from the second list;

when receiving a first request for reading the first data, check, by the processor, the first list and the second list to determine whether first information indicating the first request is registered; and when the first information is registered in the first list and the second list, moving, by the processor, the first information from the first list to the third list, and keeping the first information in the second list without moving the first information to the fourth list; and when the first information is registered in the second list and not in the first list, registering, by the processor, the first information in the first list and keeping the first information in the second list without moving the first information to the fourth list.

16. The method according to claim 15, further comprising:

receiving, by the processor, a second request for modifying the first data stored in the cache memory; and based on the second request, moving, by the processor, the first information from the second list to the fourth list.

17. The method according to claim 16, further comprising:

receiving, by the processor, a third request for modifying the first data stored in the cache memory; and when the first information is registered in the fourth list, moving, by the processor, the first information registered in the fourth list to a head position of the fourth list.

18. The method according to claim 17, further comprising:

deleting, by the processor, the first data from the cache memory when the first data stored in the cache memory is in a state of not being registered in any of the first to fourth lists.

19. The method according to claim 18, further comprising:

storing, by the memory, a fifth list, the fifth the fifth list registering information indicating data deleted from the cache memory;

registering, by the processor, the first information in the fifth list, when the first data is deleted from the cache memory, and moving, by the processor, the first information from the fifth list to the third list when the first data is requested to be read.

20. The method according to claim 19, further comprising:

determining, by the processor, a target value of a ratio between a first capacity of the first list and a third capacity of the third list.

* * * * *